Aug. 7, 1956   R. W. JOHNSON ET AL   2,757,722
BURNER OIL AND AIR CONTROL SYSTEM
Filed May 25, 1953   5 Sheets-Sheet 1

INVENTORS
ROY. W. JOHNSON
ROBERT J. DUNCAN
BY John W. Michael
ATTORNEY

INVENTORS
ROY W. JOHNSON
ROBERT J. DUNCAN
BY
John W. Michael
ATTORNEY

INVENTORS
ROY W. JOHNSON
ROBERT J. DUNCAN
BY
John W. Michael
ATTORNEY

INVENTORS
ROY W. JOHNSON
ROBERT J. DUNCAN
BY
John W. Michael
ATTORNEY

*INVENTORS*
*Roy W. Johnson*
*Robert J. Duncan*
BY
*John W. Michael*
ATTORNEY

United States Patent Office 2,757,722
Patented Aug. 7, 1956

2,757,722

BURNER OIL AND AIR CONTROL SYSTEM

Roy W. Johnson, Milwaukee, and Robert J. Duncan, Delafield, Wis., assignors to A-P Controls Corporation, Milwaukee, Wis., a corporation of Wisconsin Application May 25, 1953, Serial No. 356,952

9 Claims. (Cl. 158—28)

This invention relates to an automatic control for an oil burner and more particularly to the automatic control of oil flow to the burner and of energization of the burner fan motor and burner ignition in accordance with thermostatic demand for heat under all normal and abnormal conditions.

An object of this invention is to control a burner motor and igniter and the fuel flow to the burner in accordance with thermostatic demand for heat and to deenergize the motor and igniter and to interrupt flow of fuel through the burner in the event that any of a number of unsafe conditions occur.

Another object of this invention is to provide an automatic control for a constant level valve to permit fuel flow to a burner when there is a demand for heat and to simultaneously energize the burner motor and igniter while providing means for interrupting fuel flow and deenergizing the burner motor and igniter whenever any of a number of unsafe conditions occur.

In carrying out this invention a constant level valve, broadly of the type shown and described in Johnson Patent 2,293,903, is provided with a temperature responsive control for controlling the inlet needle and for actuating a switch which controls energization and deenergization of the burner motor and igniter. When the temperature responsive control is satisfied the control opens the motor and igniter switch and closes the inlet needle, thus taking the inlet needle out of control of the float and preventing any flow into the constant level chamber. When the temperature responsive device calls for heat a toggle-acting leverage operates to restore the inlet valve to control by the main float while simultaneously closing the burner motor and igniter circuit. As explained more fully hereinafter, the flow from the constant level valve to the burner is metered through a metering valve which is always open. The flow to the burner is dependent upon operation of the burner motor which operates the fan and also operates a system of tubes which lift the oil from a small reservoir in the burner up to the fan where the oil is whirled around against the walls of the burner. The oil is ignited by a spark igniter but should the igniter fail to operate the oil collects and drains back to the constant level valve where it is received in the overflow chamber housing an auxiliary float generally of the type shown in said Johnson patent. More specifically, this float, and the striker mechanism operated by the float, are of the type shown in Biermann et al. Patent 2,581,901. In the latter patent the auxiliary float operates a jaw member which normally holds a striker out of contact with the inlet valve but which operates to release a striker to drive the inlet needle to its seat when sufficient oil collects in the overflow chamber to raise the auxiliary float to a predetermined level. In the present structure release of the striker is operative to both close the inlet valve and to open the switch which controls the burner motor and igniter. In the illustrated embodiment the overflow chamber must be drained before the striker can be reset.

As will be pointed out more fully hereinafter, the present control need not necessarily be used with a burner of the type described above and in some cases the drain feature can be omitted, resetting being accomplished as in said Biermann et al. patent.

According to the illustrated embodiment, the safety float can also trip the striker mechanism should the inlet needle fail to close to cause the main float chamber to overflow into the auxiliary float chamber.

Other unsafe conditions are also allowed for. For example, should the temperature responsive mechanism fail the device will fail safe in that the inlet valve will be seated and the switch will be opened. Should the burner motor freeze or otherwise fail to operate there will be no delivery of oil to the burner and the only result will be a constant energization of the burner igniter until the abnormal condition has been noted and alleviated.

Other objects and advantages will be pointed out in or be apparent from the specification and claims as will obvious modifications of the single embodiment of the apparatus shown in the drawings, in which:

Figure 1:
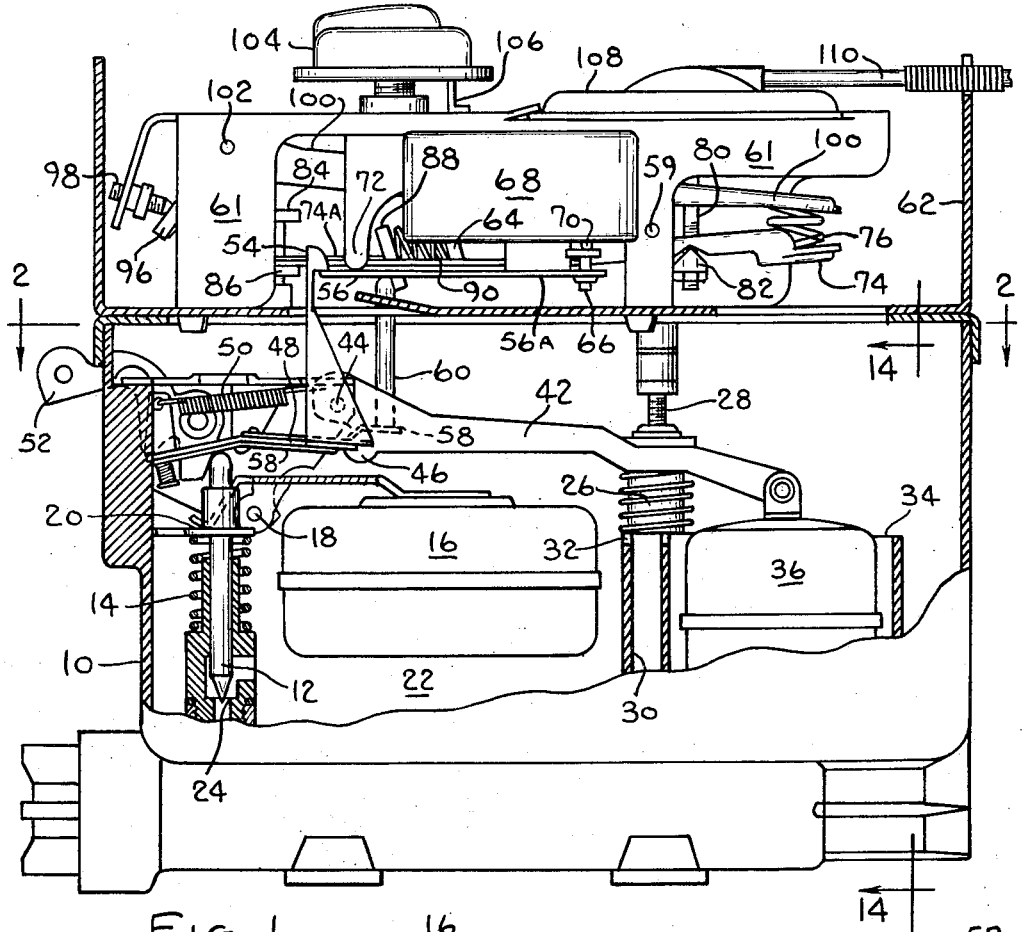
Fig. 1 is a side elevation partly in section showing the automatic control mounted on a constant level valve.
Figure 2:
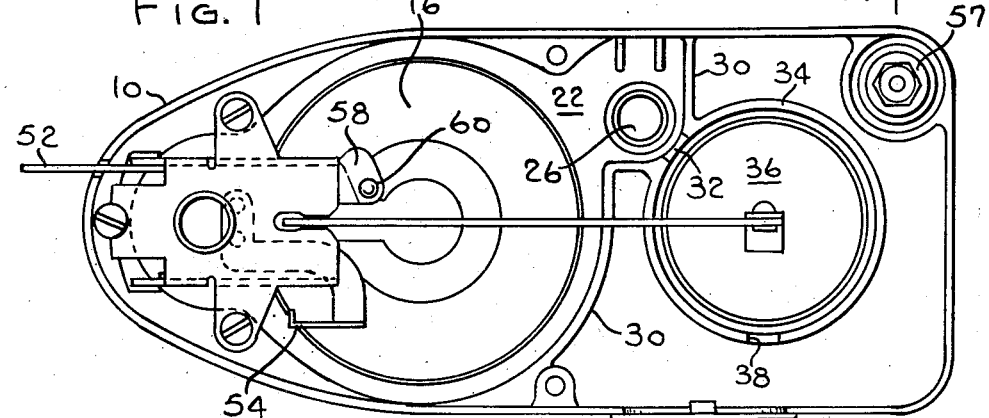
Fig. 2 is a top view of the constant level valve.
Figure 3:
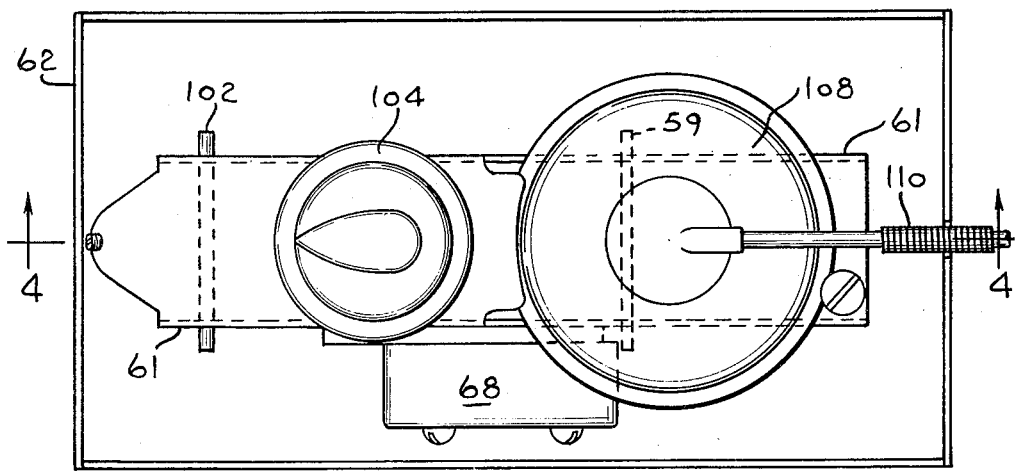
Fig. 3 is a top view of the automatic control apparatus which is mounted on top of the constant level valve.
Figure 4:
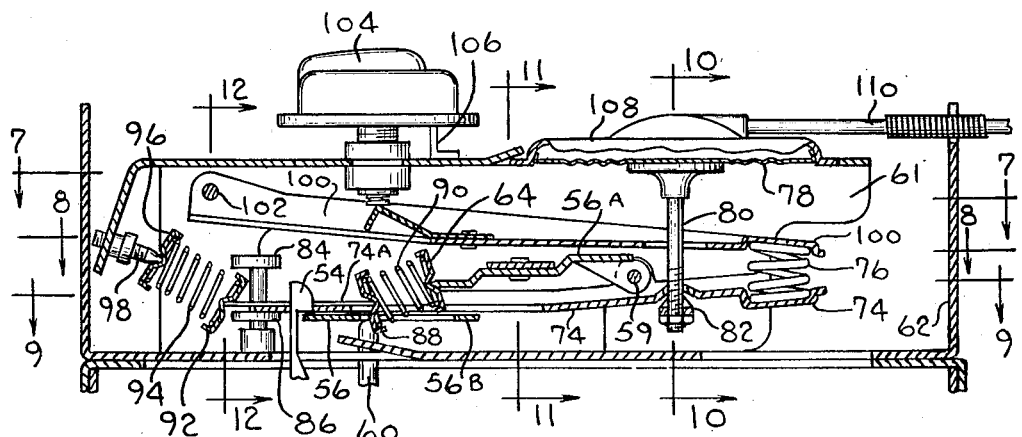
Fig. 4 is a vertical section of the automatic control taken on line 4—4 in Fig. 3 and shows the level mechanism in the positions occupied when the inlet valve is open as in Fig. 1.

Considering the drawings in detail, constant level valve 10 has an inlet needle valve 12 biased to its open position by spring 14 and regulated by float 16 which pivots at 18 to act on shoulder 20 carried by the valve. Float 16 normally regulates valve 12 to maintain a constant level in chamber 22 but needle valve 12 is so mounted that it may be driven to its seat 24 by a force applied at the top of the valve stem independently of the float action. The constant level valve also includes a metering valve 26 which, in this embodiment, is positioned by a screw 28 to the desired maximum flow position. The metering valve in this control is always open. The constant level valve is also provided with an auxiliary chamber defined by a wall 30 which is notched at 32 to allow oil to flow from the main chamber 22 into the auxiliary chamber when the level in the main chamber rises above a predetermined level due to the inlet needle sticking in its open position, for example. Within the auxiliary chamber there is a generally cylindrical slotted wall 34 which acts to guide the auxiliary float 36. The space on the interior of wall 34 communicates with the space on the exterior of the wall freely through the vertical slot 38 in wall 34. As will be pointed out more fully hereinafter, this construction may be varied to meet different needs.

Figure 14:
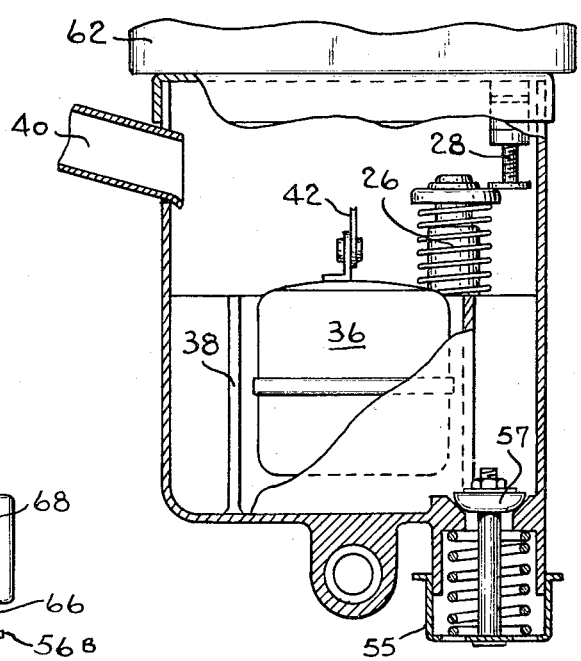
Fig. 14 is a section taken on line 14—14 in Fig. 1.

Should oil overflow from the main chamber or should oil flow back into the auxiliary chamber through the return pipe 40 (as will be described more fully hereinafter) the oil level in the auxiliary chamber will rise to cause float 36 to rise. When float 36 rises the float arm 42 will move in a counterclockwise direction about its pivot 44 to withdraw jaw 46 from the striker plate 48 and allow the striker plate to swing downwardly under influence of spring 50 to drive the needle valve to its seat and stop flow of oil into the main chamber. Reset arm 52, accessible from the exterior of the control, may be pushed down to act on the striker plate and rock the striker plate counterclockwise for reengagement with the jaw of arm 42 to reset the striker in its inactive position. However, in order to reset the striker it is first necessary to drain the auxiliary chamber by pushing upwardly on the spring loaded cap 55 (Fig. 14) to open valve 57 and allow oil to drain from the auxiliary chamber through the perforated cap 55 into a suitable receptacle. Further details of the operation of the striker release and reset and details of the manner of mounting the striker plate appear in said Biermann patent. For the purpose of understanding the present invention it is necessary only to appreciate that when the auxiliary float is raised as a result of oil flowing into the auxiliary chamber the striker is released to drive the needle shut and may be reset only after the auxiliary chamber has been drained. Reset arm 52 may be raised to release the striker for a positive shut-down when desired. Said Biermann patent shows a construction in which the float arm 42 is provided with a nose portion permitting the auxiliary float to be pushed down into the oil in the auxiliary chamber to displace the oil back to the main chamber when the reset arm 52 is pushed down to reset the striker but in the present construction such operation is not desired due to the large volume of oil in the auxiliary chamber which must be expelled in order to obtain the desired operating characteristics as will be pointed out more fully hereinafter. In the illustrated embodiment the reset arm 52 cannot be actuated to submerge float 36 and this is done by removing the nose portion of arm 42 which appears in the Biermann patent.

Figure 6:
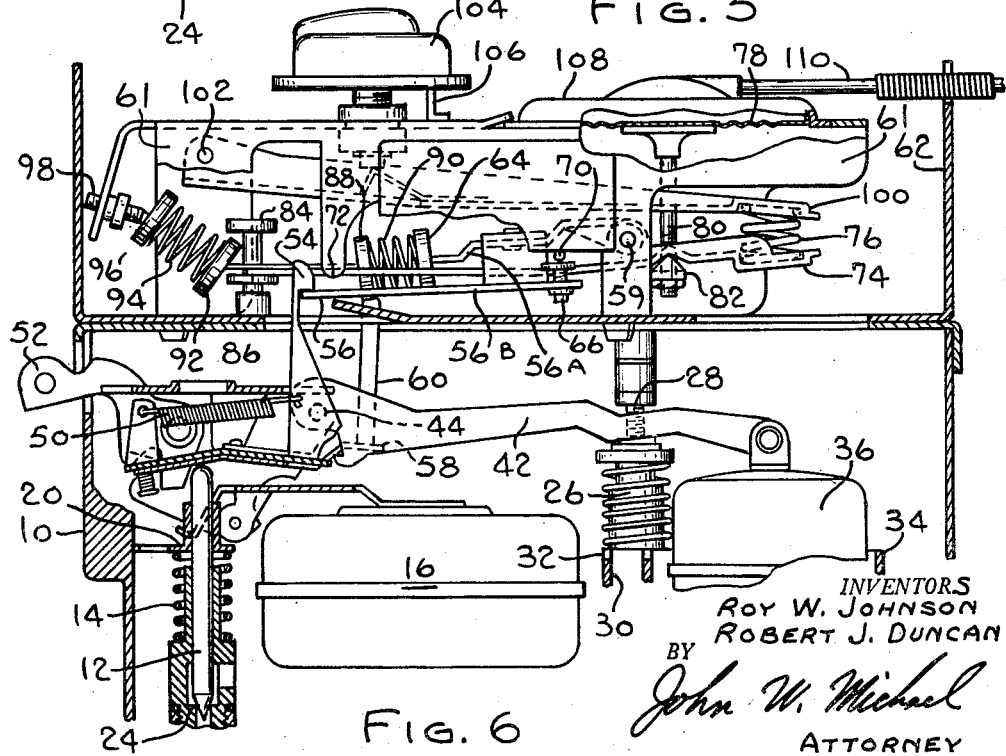
Fig. 6 is a view similar to Fig. 5 but shows the inlet valve closed and the switch open as a result of the release of the striker upon occurrence of an abnormal level in the overflow chamber.
Figure 10:
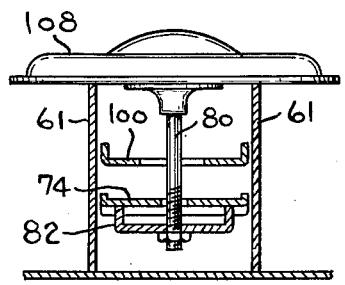
Figs. 7, 8, 9, 10, 11, 12 are sections taken on lines 7—7, 8—8, 9—9, 10—10, 11—11, 12—12, respectively, of Fig. 4.
Figure 11:
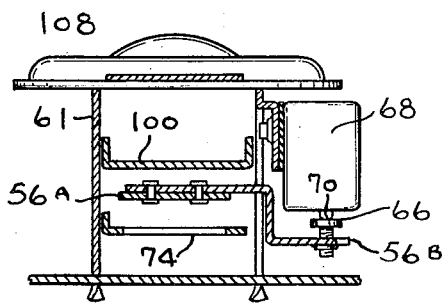
Figure 12:
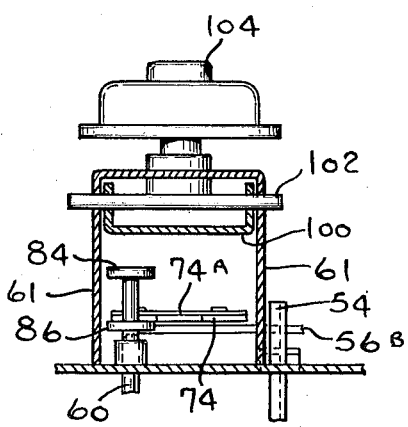

The striker in the present invention is further modified over that shown in the Biermann patent by way of provision of an upwardly projecting hook 54 which is adapted to catch and pull down the end of operating lever 56 (as shown in Fig. 6) when the striker is released. The striker also carries an arm 58 which is pivoted at the lefthand end of the striker for movement relative to the striker when pin 60 projecting upwardly therefrom is moved by operating lever 56. Operating lever 56 is a snap- or toggle-acting lever pivotally mounted on pin 59 mounted in plates 61 which are in turn fixed within top 62 mounted on the constant level valve. Lever 56 is comprised of two parts. The first, 56A is connected to the pin 59 and is provided with a sharp point which is received in a corresponding socket in spring cup 64. The other part of lever 56 is designated 56B and depends from the side of part 56A and projects outwardly to underlie switch 68 actuated by adjustable screw 66 mounted in lever part 56B. Lever part 56B also extends underneath spring cup 64 to overlie pin 60 carried by arm 58 which operates on the needle valve. Therefore, lever 56 operates switch 68 and actuates the inlet needle. Switch 68 is provided with a depending actuating pin 70 and the switch is of the snap acting variety sometimes referred to as microswitches.

Figure 5:
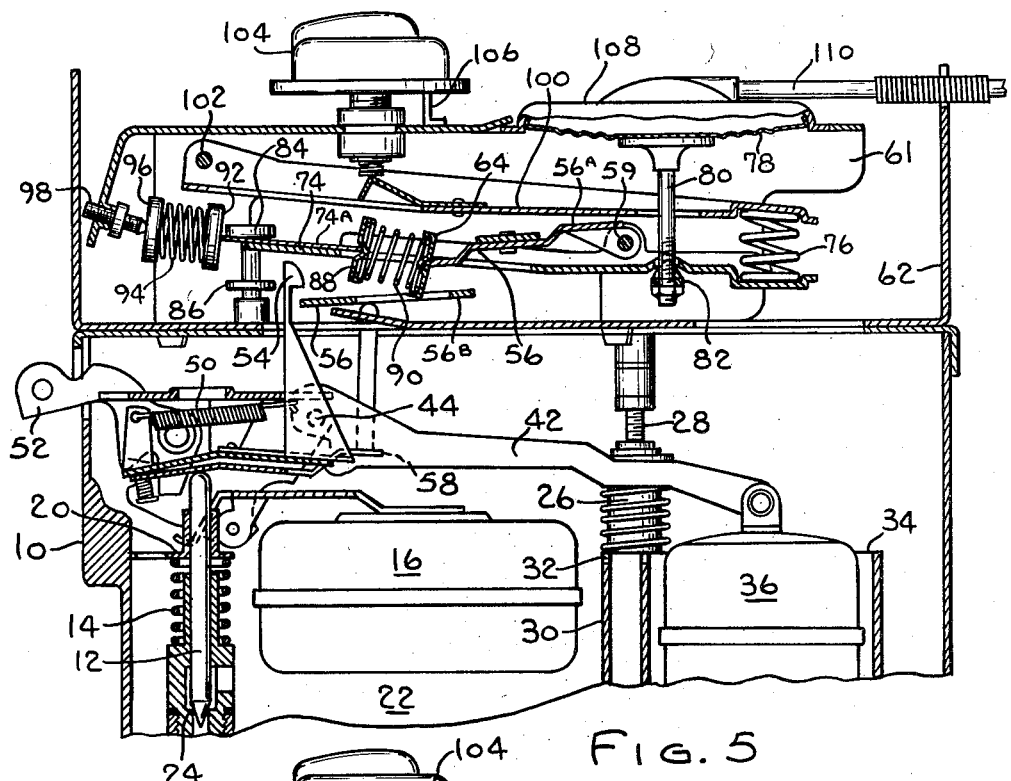
Fig. 5 is a fragmentary view similar to Fig. 1 but shows a vertical section of the levers in the position occupied when the inlet needle is closed due to satisfaction of the thermostatic demand for heat.

As mentioned above, lever 56 has a snap or toggle action. The limits of movement of this lever are between an upper limit determined by contact of the lever 56 with depending finger 72 and a lower limit determined by contact of the needle valve 12 with its seat 24 to limit downward movement of pin 60. These positions may be seen in Fig. 1 and Figs. 5 and 6, respectively. The toggle action is regulated by movement of ranging lever 74 which is also pivotally mounted on pin 59. This lever is biased by a compressed spring 76 in a clockwise direction about pivot 59 and movement of the ranging lever is regulated by diaphragm 78 through an actuating pin 80 depending therefrom. Pin 80 passes through a cooperating hole in lever 74 and is provided with a clevis 82 acting in the V-shaped notch in the underside of ranging lever 74. As the diaphragm moves up and down, it moves the ranging lever between the upper and lower limits determined by adjustable stops 84, 86, respectively, at the lefthand end of the ranging lever. The ranging lever is provided with a thin, Phosphor bronze plate 74A which is employed solely to avoid the cost of spinning points on the relatively heavy ranging lever 74. The Phosphor bronze plate 74A is riveted on lever 74 and may be stamped to provide sufficiently sharp points. One of these points is received in a corresponding socket in spring cup 88. A compressed toggle spring 90 is compressed between cup 88 and cup 64 carried by operating lever 56. Thus as the ranging lever moves between its upper (valve closed) position and its lower (valve open) position the toggle spring passes over dead center to cause operating lever to snap to its valve closed or valve open position as the case may be.

The lefthand end of the Phosphor bronze member 74A is provided with a point which is received in cup 92 which receives compressed spring 94 which is received in cup 96. The spring 94 may be adjusted by means of screw 98 to provide an adjustment of the differential in operation of this control. It will be appreciated that in the position shown in Fig. 5 the force of spring 94 is substantially along the line of ranging lever 74 while the force of spring 94 in the position shown in Fig. 6 is acting at a greater effective lever arm and tends to hold the lever 74 in the position occupied in Fig. 6 or, put another way, acts to resist movement of lever 74 back towards the upper limit stop 84. This adjustable spring is provided to make a vapor pressure system practical in that it permits of close adjustment of the differential and close adjustment of the response characteristic in general.

Figure 13:
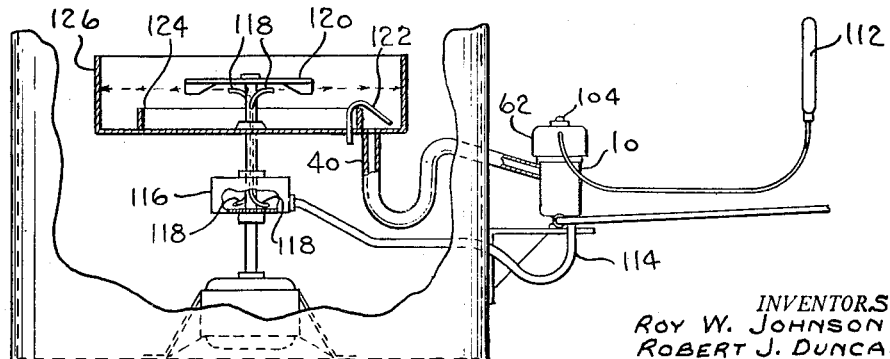
Fig. 13 is a schematic showing of the control regulating flow to the burner.
Figure 15:
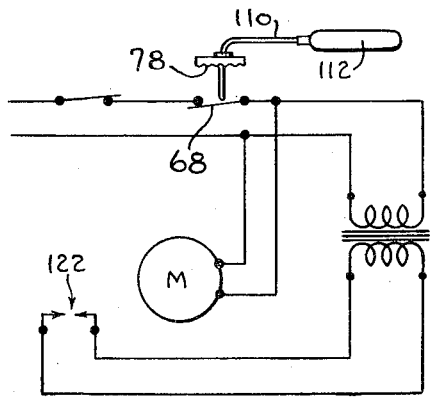
Fig. 15 is a schematic circuit diagram.
Figure 7:
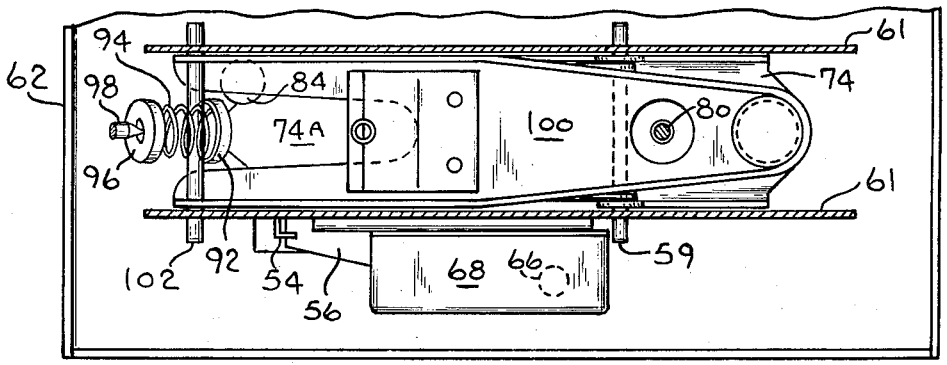
Figure 8:
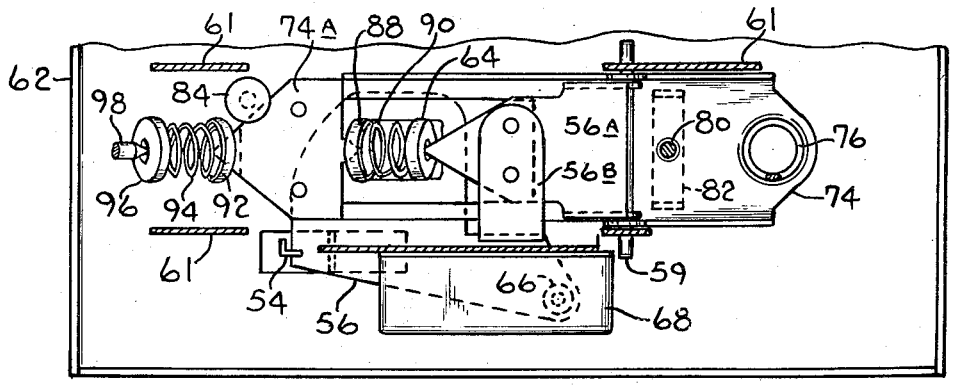
Figure 9:
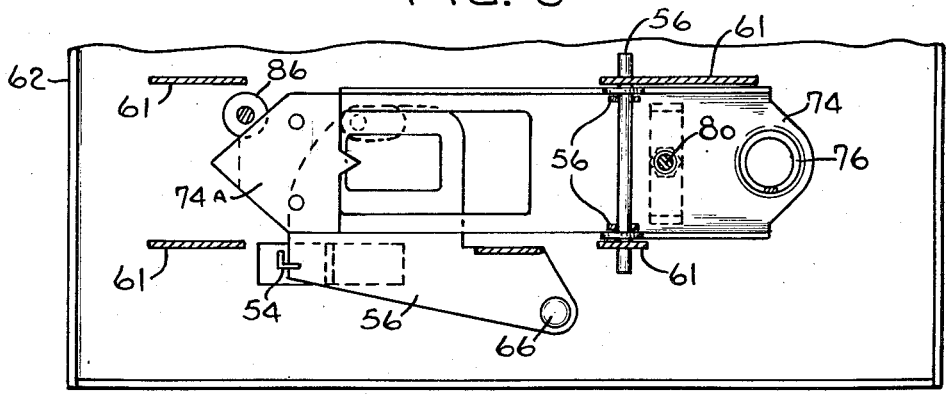

Spring 76 which acts on the right-hand end of ranging lever 74 is compressed between lever 74 and an adjusting lever 100 which is pivotally mounted on pin 102 and may be adjusted by means of knob 104 between limits determined by the engagement of stop 106 with limit positions on the underside of the knob (not shown, but of conventional construction). The adjustment of knob 104 adjusts the temperature which will be maintained by the control. The diaphragm is part of a sealed vapor pressure system which includes the diaphragm plate 108, capillary tube 110, and feeler bulb 112 (Figs. 13 and 15). The feeler bulb is strapped on the side of a water heater tank, for example, and senses the temperature of the water in the tank. When the water temperature rises to the selected temperature the pressure moves the diaphragm downwardly until compressed spring 76 moves ranging lever 74 clockwise about pivot 59 to the upper limit and the toggle spring 90 passes over center to snap the operating lever down to seat needle valve 12 and to open the switch. This switch controls energizaiton of the burner motor and the burner igniter 122. When the temperature sensed by feeler bulb 112 drops a predetermined amount the decreasing pressure causes diaphragm 78 to move upwardly and rotate ranging lever 74 in a counterclockwise direction about pivot 59 until the operating lever 56 again snaps over center to allow needle valve 12 to open and to close motor and igniter switch 68.

The present control is designed for use with the spinning type burner in which flow from the valve outlet passes through conduit 114 to a small reservoir 116 into which tubes 118 dip to pick up oil from the reservoir when rotated by the motor. Energization of the motor actuates fan 120 to draw combustion air into the burner while the spinning tubes pick up oil from the reservoir and throw it out against the outside of the burner chamber where the oil is ignited by a spark igniter 122. The inside of the burner is provided with a circular dam 124 and in the event that ignition should fail oil collects in the annular space between the dam 124 and the outside wall 126 of the burner. This oil drains back to the constant level valve through return conduit 40 to cause the auxiliary float to release the striker plate to prevent continued delivery of oil to the burner by closing the inlet needle forcibly. As the striker plate moves down to close the inlet needle, the hook 54 carried by the striker plate catches the free end of lever 56 to pull it downwardly and move switch actuating screw 66 carried by the lever away from switch pin 70 to open the switch and deenergize the burner motor and igniter. When it is desired to put the control back into operation it is necessary to first drain the auxiliary chamber as described above.

From the above it will be appreciated that this control regulates the flow of oil to the burner in normal course of operation but should ignition fail the control operates to shut off flow of fuel and to deenergize the motor and ignition switch. As pointed out above, the chamber must be drained in this embodiment in order to permit the auxiliary float to go back to its normal position and to permit the striker plate to be reset. The auxiliary float will operate to release the striker and open the switch in the event that the inlet needle sticks in the open position to cause oil to overflow into the auxiliary chamber.

It is to be noted that even though the metering valve is always open to allow flow of oil from the control to the reservoir 116 there will be no overflowing at the reservoir 116 since its level corresponds with the level in the constant level chamber. Therefore, when the motor is deenergized the flow of oil to the burner is interrupted (the flow from the reservoir to the burner being dependent upon motor operation). If it is desired to positively shut this unit down the reset lever 52 may be moved upwardly to disengage the striker plate from the jaws to open the switch and close the needle and thereby prevent further operation until the reset arm is moved downwardly to reset the striker in the jaws.

As pointed out previously, the same basic control can be provided without the overflow return from the burner and without the drain at the bottom of the auxiliary chamber. In this case the slotted construction would not be used in the wall 34 and a resetting nose would be provided on the arm 42. In other words the arm 42 would again take the form shown in said Biermann et al. patent and in fact the well for the auxiliary float would be in the same form as shown in the Biermann et al. patent. Thus the present control could be used to supply fuel to a conventional pot type burner. In order to secure shut down of the motor and ignition in the event ignition fails to take place a stack switch would be employed to open a line switch independently of the operation or position of switch 68. Such a stack switch would, of course, be operated only in the event a predetermined temperature failed to occur within any given period of time after a call for heat. The details of such construction, however, are no part of the present invention. The present shut down feature in response to movement of the auxiliary float would still comprise a safety feature. Another feature which might possibly be incorporated in such a control would be an arm extending from arm 58 to the metering valve to shut the metering valve when the control acts to close the inlet needle. This then would provide positive On Off operation of the flow to a conventional pot type burner.

We claim:

1. A burner and fuel flow control comprising, a burner, a fan for supplying combustion air to the burner, a motor driving the fan, a constant level valve including a housing having a chamber therein, an inlet to and an outlet from said chamber, a valve for regulating flow through said inlet, motor means mounted on said housing, temperature responsive means operatively connected to the motor means for controlling the motor means in accordance with temperature, lever means operatively connecting said motor means to said inlet valve to transmit motion from the motor means to the inlet valve and control movement of the inlet valve, a switch in circuit with said fan motor, said lever means being operatively connected to said switch to close the switch when the valve is opened by said motor means and to open the switch when the inlet valve is closed by said motor means, and a float mounted in said chamber and operative to act on said valve to regulate movement of the valve to maintain a predetermined liquid level within said chamber when said lever means is in its valve open position, said float being inoperative to regulate the valve when the lever means has acted to close the valve.

2. Apparatus according to claim 1 including an auxiliary chamber in said housing, a drain from the burner to said auxiliary chamber, a safety float in said auxiliary chamber, a striker pivotally mounted above the inlet valve, means biasing the striker to close the valve, means operated by the safety float and adapted to normally engage and retain the striker in an inoperative position and to release the striker for movement under influence of said biasing means when the safety float rises due to liquid filling said auxiliary chamber, and means operatively connecting the striker and said lever means to act on the lever means to open the switch when the striker is released.

3. Apparatus according to claim 2 in which the lever means comprises a compound leverage having a toggle action so that the lever means acts to either close the valve and to move the valve to its maximum open position.

4. A burner and fuel flow control, comprising, a housing including a chamber having a flow control orifice therein, a valve for regulating flow through said orifice, a burner, flow through said orifice being delivered to said burner, a fan for supplying air to the burner, a motor driving the fan, a switch connected in circuit with the fan motor, temperature responsive motor means operatively connected to said valve and said switch to open the valve and close the switch or to close the valve and open the switch, an auxiliary chamber in said housing, a drain from the burner to said auxiliary chamber, and means responsive to a predetermined level in said auxiliary chamber to act on said motor means to close said valve and open said switch.

5. A control according to claim 4 including an igniter for the burner and wired in circuit with said fan motor and said switch.

6. Combustion apparatus comprising, a burner, a burner system including a motor and a fan driven by said motor to supply combustion air to the burner, a housing having a chamber provided with a fuel inlet and a fuel outlet, said outlet being connected to the burner, a valve for regulating flow through the inlet, a valve for regulating flow through the outlet, a float mounted in said chamber and operatively connected to said inlet valve to regulate movement thereof to maintain a constant level in the chamber, an igniter in the burner for igniting fuel flowing into the burner from the outlet, motor means mounted on said housing, temperature responsive means operatively connected to the motor means for controlling the motor means in accordance with temperature of a space, lever means operatively connecting said motor means to one of said valves to transmit movement from the motor means to the valve, a switch connected in an electric circuit including said igniter and said motor, said lever means being operatively connected to said switch to close the switch when the motor means moves the lever means in a valve opening direction and to open the switch when the motor means moves the lever means in the valve closing direction, an auxiliary chamber in said housing, a drain from the burner back to said auxiliary chamber to allow fuel flow from the burner to the auxiliary chamber in the event combustion fails to take place, an auxiliary float in said auxiliary chamber, safety means mounted in the housing and biased to an operative position, means connected to the auxiliary float and engageable with the safety means to retain the safety means in inoperative position when said auxiliary float is not floating and operative to release the safety means for movement to said operative position upon flow of oil into the auxiliary chamber to cause the auxiliary float to float, and means operatively connecting said safety means to said lever means and move the lever means to a position in which the switch is open and the valve operated by the lever means is closed when the safety means is in its operative position.

7. Apparatus according to claim 6 in which said lever means comprises a compound leverage having a toggle action.

8. Apparatus according to claim 7 in which the valve operated upon by the lever means is the inlet valve.

9. Apparatus according to claim 8 in which said safety means comprises a striker plate pivotally mounted in said housing above the inlet valve, spring means biasing the striker towards its operative position, said striker being operative to drive the inlet valve to its seat when released for movement to its operative position.

References Cited in the file of this patent

UNITED STATES PATENTS

| | | |
|---|---|---|
| 1,783,213 | Bennett | Dec. 2, 1930 |
| 2,256,121 | McCarty | Sept. 16, 1941 |
| 2,258,043 | Brace | Oct. 7, 1941 |
| 2,288,536 | McCarty et al. | June 30, 1942 |
| 2,346,813 | Breese | Apr. 18, 1944 |
| 2,456,170 | Bennett | Dec. 14, 1948 |
| 2,581,901 | Biermann et al. | Jan. 8, 1952 |
| 2,640,648 | Judson | June 2, 1953 |
| 2,703,606 | Johnson et al. | Mar. 8, 1955 |